United States Patent [19]

Galante

[11] Patent Number: 5,272,210
[45] Date of Patent: Dec. 21, 1993

[54] POLYMER BLENDS CONTAINING PROPYLENE-ETHYLENE COPOLYMER AND ETHYLENE-ALKYL ACRYLATE COPOLYMER

[75] Inventor: Nicholas R. Galante, Orange, Calif.

[73] Assignee: Chevron Research and Technology Company, San Francisco, Calif.

[21] Appl. No.: 983,915

[22] Filed: Dec. 1, 1992

[51] Int. Cl.$^5$ .................. C08L 23/16; C08L 23/08; C08L 33/08

[52] U.S. Cl. ................... 525/227; 428/220

[58] Field of Search .......................... 525/227

[56] References Cited

U.S. PATENT DOCUMENTS 3,555,110  1/1971  McConnell .................. 525/227
4,234,656  11/1980  Amembal ..................... 525/194

FOREIGN PATENT DOCUMENTS 2733470  2/1979  Fed. Rep. of Germany ...... 525/227

*Primary Examiner*—David J. Buttner
*Attorney, Agent, or Firm*—R. J. Sheridan

[57] ABSTRACT

Compositions are provided comprising a propylene-ethylene copolymer containing about 1 to about 7 weight percent ethylene and an ethylene-alkyl acrylate copolymer containing at least about 20 weight percent ethylene, wherein the composition contains about 10 to about 25 weight percent alkyl acrylate, based on the combined weight of propylene-ethylene copolymer and ethylene-alkyl acrylate copolymer. Films made from these compositions have good RF sealing properties, as well as good flexibility at low temperatures.

24 Claims, No Drawings ns that films made from the compositions of this invention are RF sealable when a signal having about 27.2 MHz frequency, and about 1.1 KW/inch.² power is applied for about 1.5 seconds. In comparison, films made from the propylene-ethylene copolymer alone will not RF seal.

POLYMER BLENDS CONTAINING PROPYLENE-ETHYLENE COPOLYMER AND ETHYLENE-ALKYL ACRYLATE COPOLYMER

FIELD OF THE INVENTION

The present invention relates to polymer blends comprising a propylene-ethylene copolymer and an ethylene-alkyl acrylate copolymer.

BACKGROUND OF THE INVENTION

Polymer blends containing propylene polymers and ethylene copolymers are known. For example, U.S. Pat. No. 3,433,573, issued Mar. 18, 1969 to Holladay et al., discloses compositions containing blends of 5 to 95% by weight of a propylene polymer containing a major amount of propylene and 95 to 5% by weight of a copolymer of ethylene with a polar monomer such as vinyl acetate, methyl methacrylate, vinylidene carbonate, alkyl acrylates, vinyl halides and vinylidene halides. However, the only ethylene copolymer used in the examples is an ethylene-vinyl acetate copolymer. These compositions are said to be useful in fibers, films and molded articles of improved dyeability and low temperature characteristics.

U.S. Pat. No. 3,555,110, issued to McConnell et al. on Jan. 12, 1971, discloses that ethylene copolymers such as ethylene/alkyl acrylate, ethylene/aryl acrylate and ethylene/alkenyl carboxylate copolymers are compatible with alpha-monoolefin block polymers such as propylene/ethylene polymers having from about 50% to 99% by weight of polypropylene segment in the polymer chain. Objects prepared from these polymer blends are said to have excellent clarity, improved low temperature properties and good impact strength at low temperature.

U.S. Pat. No. 4,774,277, issued on Sep. 27, 1988 to Janac et al., discloses compositions useful in the preparation of film which is said to be soft and have high tensile, tear and impact strength. The compositions contain polyolefin plastics blended with an elastomeric plasticizer. The disclosed polyolefin plastics are polypropylene, polypropylene reactor copolymer, polybutylene, linear low density polyethylene, high density polyethylene or mixtures thereof. The elastomeric plasticizer contains (1) polyethylnne or a copolymer of ethylene and an unsaturated ester of a lower carboxylic acid, (2) olefin elastomer, such as copolymers of ethylene with higher alpha-olefins such as propylene containing about 30–90 weight percent ethylene, and (3) a hydrocarbon oil.

U.S. Pat. No. 4,835,218, issued May 30, 1989 to Yoshimura et al., discloses a composition for shrinkable film which is said to have good heat sealability, transparency, strength, and low temperature quick shrinking properties. The composition contains specific combinations of (A), (B) and (C), i.e., the combinations of (A)+(B), (B)+(C), and (A)+(B)+(C), wherein (A) is non-rigid polyolefin resins such as ethylene-vinyl acetate, (B) is an elastomer comprising a specific ethylene-alpha-olefin copolymer and an elastomer consisting of block copolymer having at least one monovinyl substituted aromatic hydrocarbon polymer block and at least one polyolefin polymer block selected from at least one saturated polymer or unsaturated polymer made from mainly aliphatic conjugate diene derivative, and (C) is rigid polyolefin resins such as polypropylene.

SUMMARY OF THE INVENTION

In accordance with the present invention, there is provided a composition comprising:
A. a propylene-ethylene copolymer comprising about 1 to about 7 weight percent ethylene; and
B. an ethylene-alkyl acrylate copolymer comprising at least about 20 weight percent alkyl acrylate,
wherein the percent by weight of alkyl acrylate, based on the weight of A and B, is from about 10 to about 25.

Also provided in accordance with the present invention is a film made from a composition comprising:
A. a propylene ethylene copolymer comprising about 1 to about 7 weight percent ethylene; and
B. an ethylene-alkyl acrylate copolymer comprising at least about 20 weight percent alkyl acrylate,
wherein the percent by weight of alkyl acrylate, based on the weight of A and B, is from about 10 to about 25.

Among other factors, the present invention is based upon the discovery that films made from the compositions of this invention are RF sealable when a signal having about 27.2 MHz frequency, and about 1.1 KW/inch.² power is applied for about 1.5 seconds. In comparison, films made from the propylene-ethylene copolymer alone will not RF seal.

DETAILED DESCRIPTION OF PREFERRED EMBODIMENTS

The propylene-ethylene copolymers useful in the compositions of this invention comprise copolymers of propylene and ethylene in which the ethylene comprises about 1 to about 7, preferably about 1 to about 5, more preferably about 2 to about 2.5 weight percent of the copolymer, based on the combined weight of propylene and ethylene. These propylene-ethylene copolymers may also contain minor amounts of at least one additional monomer, such as butene, though this additional monomer(s) is not necessary.

The propylene-ethylene copolymers of this invention are random copolymers. That is, the propylene and ethylene are randomly distributed along the polymer chain, as opposed to being present in block copolymer form.

Examples of the propylene-ethylene copolymers useful in this invention include the copolymer designated SA861 having a melt flow rate (as measured by ASTM D12386) of about 6 and an ethylene content of about 2.2 weight percent, and the copolymer designated KT011P, both of which are sold by Himont Inc. The preferred propylene-ethylene copolymer is SA861.

The ethylene-alkyl acrylate copolymers which form part of the compositions of this invention are copolymers of ethylene and one or more alkyl acrylates. Examples of the alkyl acrylates include, but are not limited to, acrylic esters of linear, branched or cyclic alcohols having 1–28 but not limited to, methyl acrylate, ethyl acrylate and butyl acrylate, with methyl acrylate and butyl acrylate being preferred.

One preferred group of ethylene ester copolymers are ethylene-alkyl acrylate copolymers which have high melting points. These ethylene alkyl acrylate copolymers have an alkyl acrylate content of X weight percent, X being 20 or more and being based on the total weight of ethylene and alkyl acrylate in the copolymer, the copolymer having an average melt-point temperature equal to or greater than the value obtained from the expression:

temperature (deg F)=238−2.16X.

One example of these copolymers are ethylene-methyl acrylate copolymers having a methyl acrylate content of Y weight percent, Y being 20 or more and being based on the total weight of ethylene and methyl acrylate in the copolymer, the copolymer having an average melt-point temperature equal to or greater than the value obtained from the expression:

temperature (deg F)=248−2.9Y.

Another example of these copolymers are ethylene butyl acrylate copolymers having a butyl acrylate content of Z weight percent, Z being 20 or more and based on the total weight of ethylene and butyl acrylate in the copolymer, the copolymer having an average melt-point temperature equal to or greater than the value obtained from the expression:

temperature (deg F)=240−2.1Z.

These high melt point ethylene-alkyl acrylate copolymers can be made by a process comprising:
  A. feeding overall an amount by weight, A, of alkyl acrylate and an amount by weight, E, of ethylene to a multi-zoned polymerization reactor;
  B. introducing an effective amount of an initiator and at least a portion, $E_1$, of the total amount of ethylene into a first reaction zone of the reactor;
  C. concurrently introducing a portion, $A_1$, of alkyl acrylate to said first reaction zone such that (1) greater than about 55% of the overall amount of alkyl acrylate is introduced into said first reaction zone, (2) the amount, $A_1$, of alkyl acrylate fed to said first reaction zone is greater than the total amount of alkyl acrylate fed to all subsequent reaction zones, and (3) the ratio of $A_1$ to $E_1$ in said first reaction zone is equal to or greater than the ratio of A to E for the reactor overall; and
  D. feeding any remaining portions of initiator, ethylene and alkyl acrylate to a subsequent reaction zone or zones.

Preferably, the ratio of $E_1$ to E is between about 0.25 and about 0.75, more preferably about 0.50, and the ratio of $A_1$ to $E_1$ is preferably greater than 1.2, more preferably greater than 1.4 times the ratio of A to E.

Another process for the preparation of these high-melting ethylene-alkyl acrylate copolymers comprises introducing to a first reaction zone in a multi-zone reactor, initiator, ethylene and a quantity of an alkyl acrylate which is (1) in excess of 50% of the amount of alkyl acrylate fed overall to the reactor and (2) greater than the total amount of alkyl acrylate fed to all subsequent reaction zones, said quantity of alkyl acrylate being effective to increase the average melt-point temperature of said copolymers at least about 8° F. over the melt-point temperature of a copolymer having the same alkyl acrylate content by weight as said produced copolymer and made by introducing about 50% of the alkyl acrylate fed overall to the reactor to said first reaction zone and about 50% of the ethylene fed overall to the reactor to said first reaction zone.

These processes are descirbed in greater detail below. As used herein, the following terms have the following meanings:
  1. "A" is used herein to denote the total amount by weight of alkyl acrylate fed to the reactor.
  2. "$A_1$" is used to denote the portion of the amount A which is fed to first reaction zone in said reactor.
  3. "E" is used to denote the total amount by weight ethylene fed to the reactor.
  4. "$E_1$" is used to denote the portion of the amount E which is fed to the first reaction zone.

One appropriate measure of these amounts is pounds (mass).
  5. "First reaction zone" refers to the area in a reactor where ethylene and alkyl acrylate come into contact under polymerization conditions, and a substantial amount of polymerization occurs.

However, the "first reaction zone" need not be the first in a sequence of zones in the reactor. For example, ethylene and/or alkyl acrylate could be introduced into a zone of the reactor prior to the "first reaction zone," but if no significant polymerization occurs in this prior zone (e.g., less than about 5% of the total reaction takes place), this zone is not considered herein to be the "first reaction zone."
  6. "Reaction zone" refers to an area within a single reaction vessel in which polymerization of the ethylene and/or alkyl acrylate takes place. Typically, the "reaction zone" is a portion of a single reaction vessel which is segregated from other areas of the same reaction vessel. This segregation can be accomplished by physical barriers (such as baffles and the like), or other suitable means (such as the mixing patterns within the reaction vessel). As used herein, the term "reaction zone" also includes areas in separate, multiple reaction vessels where polymerization occurs. Although multiple reactors may be used, in one preferred embodiment, the process uses a multi-zoned, high-pressure autoclave reactor. A 4-zone reaction system is preferred and is exemplified in FIG. 1, although additional zones, such as six, or fewer zones, such as two zones, can be used.

This process starts by feeding ethylene gas under high pressure to the reactor.

Preferably, the ethylene is fed into the top of the reactor and into Reaction Zone 1. The reactor zones are numbered from top to bottom. Alkyl acrylate monomer is fed to the reactor in an overall amount by weight of A pounds, and is divided to feed selected zones. In one embodiment, Zone 1 is fed $A_1$ pounds, and Zone 2 is fed $(A-A_1)$ pounds.

In a continuous process the total feed of alkyl acrylate relative to the total ethylene feed determines the alkyl acrylate content of the final copolymer. A copolymer containing 20 wt% alkyl acrylate has a smaller total feed ratio of alkyl acrylate to ethylene (A/E) than a copolymer containing 30 wt% alkyl acrylate. To achieve the desired product, an overall A/E feed ratio is chosen and generally maintained throughout a production run, although the ratio A/E can be varied over time to produce copolymers containing different weight percentages of alkyl acrylate.

The ratio of the amount by weight of alkyl acrylate monomer to the amount by weight of ethylene monomer in a first reaction zone ($A_1/E_1$) relative to the ratio of the overall amount by weight of alkyl acrylate monomer to the overall amount by weight of ethylene monomer (A/E) is critical to obtain the improved properties of this type of ethylene-alkyl acrylate copolymer. If the ratio $A_1/E_1$ is equal to or greater than the overall ratio A/E required to make the ethylene-alkyl acrylate copolymer, and if $A_1$ is at least about 55% of A and exceeds the amount of alkyl acrylate, if any, fed to all subsequent zones, then the melt-point temperature of the copolymer is significantly increased over conventional copolymers having the same alkyl acrylate content.

In one preferred embodiment of this process, the ethylene, E, fed to the 4-zone is divided so that $E_1$, the amount of ethylene in a first reaction zone (in this case, Zone 1), is about 25% to 75%, and, more preferably, about 50%, of E. About 75% to 25%, and more preferably about half, of the ethylene monomer is fed into Zone 2. $A_1$ is controlled such that $A_1$ is greater than 55%, preferably at least 70%, of A and such that the ratio $A_1/E_1$ is equal to or greater than the ratio of A/E. Preferably, the ratio $A_1/E_1$ is greater than about 1.4, and more preferably is in excess of 1.8, times the ratio A/E. Most preferably, all of the alkyl acrylate is added to the first reaction zone in order to attain ethylene-alkyl acrylate copolymers having the highest melt-point temperatures.

The preferred temperature in the first reaction zone is about 300° F. to 450° F., and more preferably is about 325° F. to 425° F.

High pressures are preferred when producing these high melting ethylene-alkyl acrylate copolymers. The reaction zone pressure preferably is about 10,000 to about 40,000 psig, more preferably about 15,000 to about 35,000 psig, and most preferably is about 20,000 to about 30,000 psig.

A free radical initiator is preferably used to catalyze the polymerization. The initiator can be added into any zones where polymerization is desired. The initiator preferably is fed into at least the first reaction zone in a sufficient amount and rate whereby the temperature of the liquid phase in the reaction zone is controlled in the range specified above.

The initiator may be added to the reaction zone(s) in any suitable manner. Generally, it is dissolved in a suitable solvent, typically a hydrocarbon, and injected into the zone(s). Normally, the initiator and alkyl acrylate are simultaneously injected into the reaction zone(s), though this is not essential. In a preferred embodiment, the initiator and alkyl acrylate are simultaneously injected into the reaction zone via concentric tubes, one carrying the initiator and the other carrying the alkyl acrylate.

Examples of initiators include, peroxides such as lauroyl peroxide, t-butyl perbenzoate, t-butyl peroxypivalate and di-t-butyl peroxide. A preferred initiator is t-butyl peroxypivalate. Typically, the initiator is dissolved in a liquid hydrocarbon such as hexane or mineral oil.

In preparing the high-melting ethylene-alkyl acrylate copolymers, is desirable to add an oxygen scavenging compound to the reaction mixture. Phenolic compounds are useful in this regard. These phenolic compounds include 2,6-di-t-butyl-4-methylphenol (BHT) and 2,6-di-t-butyl-4-ethylphenol (BHEB). These compounds are well known in the art; see U.S. Pat. No. 3,941,747, issued Mar. 2, 1976 to Roth et al., which is incorporated herein by reference. A preferred compound is BHEB. The addition of the oxygen scavenging compound is at a rate such that the concentration of the compound is preferably 0.01 to 0.5, more preferably 0.05 to 0.10 wt%, of the total copolymer produced.

The reaction mixture is agitated within the first reaction zone to produce both radial and longitudinal mixing. Preferably a substantially uniform reaction temperature is maintained.

The reaction mixture proceeds from the first reaction zone into a second reaction zone. The reaction mixture in the second zone preferably is agitated to produce good radial and longitudinal mixing. Preferably, the remaining alkyl acrylate monomer, ethylene and additional free radical initiator are introduced into the second reaction zone. Also preferably, the three components are added separately. The initiator is fed into the second reaction zone in a sufficient amount and rate whereby the temperature of the liquid phase in the final reaction zone is controlled to about 350° F. to 450° F., more preferably to about 350° F. to 425° F., and most preferably 375° F. to 425° F.

Preferably, there are one or more reaction zones after the second reaction zone which are used to further polymerize the ethylene and alkyl acrylate monomers. The reaction mixture is removed from the end of Zone 2 (the second reaction zone, in this case) and introduced into, e.g., two additional reaction zones, where the mixture is agitated to produce both radial and end-to-end mixing.

The amount of alkyl acrylate in the compositions of the present invention has been found to be critical in two respects. First, the overall amount of alkyl acrylate in the composition must be from about 10 to about 25 percent by weight of the composition, based on the combined weight of the propylene-ethylene copolymer and ethylene-alkyl acrylate copolymer. However, it has been found that it is not enough simply to provide compositions with this amount of alkyl acrylate in order to make films which have good RF sealing properties. Instead, it has been found that the ethylene alkyl acrylate copolymer used in the compositions must contain a minimum amount of alkyl acrylate, i.e., at least about 20 weight percent alkyl acrylate. Thus, it has been found that it is not sufficient to merely provide a composition containing a minimum amount of alkyl acrylate (as by making a composition containing a large amount of ethylene-alkyl acrylate copolymer which, in turn, contains a very small amount of alkyl acrylate), but rather the alkyl acrylate must be concentrated in an ethylene alkyl acrylate copolymer containing relatively large amounts of alkyl acrylate (e.g., 20 weight percent or more).

It is apparent from the foregoing discussion of the amount of alkyl acrylate in both the ethylene-alkyl acrylate copolymer and the overall composition that the relative proportions of the propylene-ethylene copolymer and ethylene-alkyl acrylate copolymer will depend upon the alkyl acrylate content of the particular ethylene-alkyl acrylate copolymer employed. Thus, for example, more of an ethylene-alkyl acrylate copolymer containing about 20 weight percent alkyl acrylate would be necessary to satisfy the requirement that the overall composition contain about 10 to 25 weight percent alkyl acrylate than would be required for an ethylene-alkyl acrylate copolymer containing, e.g., 30 weight percent alkyl acrylate. Typically, the compositions of this invention contain at least about 20 weight percent, based on the combined weight of the propylene-ethylene copolymer and ethylene-alkyl acrylate copolymer, of propylene-ethylene copolymer, with the balance being ethylene-alkyl acrylate copolymer containing sufficient alkyl acrylate to satisfy the requirement of about 10 to about 25 weight percent alkyl acrylate, based on the combined weight of the propylene-ethylene copolymer and ethylene-alkyl acrylate copolymer.

In one preferred embodiment of this invention, compositions are provided comprising a propylene-ethylene copolymer and an ethylene-alkyl acrylate copolymer wherein the ethylene-alkyl acrylate copolymer comprises about 20 to about 25 weight percent alkyl acrylate, and the percent by weight of alkyl acrylate, based on the combined weight of the propylene-ethylene copolymer and ethylene-alkyl acrylate copolymer, is at least about 15. In another preferred embodiment, the present invention provides such compositions wherein the alkyl acrylate content of the propylene-ethylene copolymer is about 25 weight percent and the weight percent alkyl acrylate, based on the weight of propylene-ethylene copolymer and ethylene-alkyl acrylate copolymer, is at least about 10.

The compositions of the present invention may be made simply by blending the propylene-ethylene and ethylene-alkyl acrylate copolymers until a uniform mixture is achieved. This may be accomplished by techniques well known in the polymer arts, such as by blending in mechanical mixers like a Brabender Plasticorder, a roll mill, a single or multiple screw extruder or any of the other well-known mechanical mixing equipment normally used in the mixing, compounding, processing or fabrication of low or high molecular weight thermoplastic, elastomeric or thermosetting polymers or mixtures thereof. Preferably, the mixing is conducted at a temperature high enough for the propylene-ethylene copolymer and ethylene-alkyl acrylate copolymer to be in a deformable, e.g., molten, state, but low enough that the polymers are not degraded during mixing. A typical mixing temperature would be in the range of from about 400° F. to about 450° F.

Likewise, the compositions of this invention may be formed into films by a variety of techniques known in the films making art. One preferred manner of making films from the compositions of this invention is by standard blown film extrusion techniques, although conventional cast film extrusion, sheet extrusion and calendaring techniques may be used as well.

When the compositions of this invention are made into thin films, such as films which are 4 mils thick, the films have several beneficial properties. First, the films are RF sealable using lower frequencies and less power than, for example, films made from blends of polypropylene (homopolymer) and an ethylene-alkyl acrylate copolymer (see Table I below). These 4 mil films provide excellent RF seals at about 27.2 MHz frequency and about 1.1 KW/inch$^2$ power for about 1.5 seconds, as opposed to the unsealable (by RF sealing) films made from a polypropylene homopolymer/ethylene-alkyl acrylate copolymer blend.

In addition, the 4 mil films have excellent flexibility, especially at low temperatures. This is especially useful in applications, such as blood bags, where the film will be subjected to extremely low temperatures (e.g., −35° C. Red Cross Standard), yet must remain flexible.

The films of this invention also possess other good properties, such as optical and physical properties. For example, the films of this invention have about 20% haze, tensile strength greater than 3,300 psi and greater than 700% elongation. In addition, the films of this invention are typically autoclavable at 120° C. for 0.5 hour without deleterious effects.

Presently, the standard bags for storing blood are made from poly(vinyl chloride). These PVC bags, however, can crack and break at the very low temperatures at which blood is typically stored. Also, the PVC used to make these blood bags has a density of about 1.26–1.3, and the PVC film used to make the blood bags is about 14 mils thick. In contrast, the compositions of the present invention have a density of only about 0.93, representing a weight savings of about 30% compared to PVC.

The compositions of this invention also have advantages over compositions containing polypropylene (homopolymer) and ethylene-alkyl acrylate copolymers ("PP/EAA") and compositions containing polypropylene (homopolymer) and ethylene-vinyl acetate copolymer ("PP/EVA"). For example, films made from the PP/EAA compositions do not RF seal as well as the compositions of this invention. The compositions of this invention also contain fewer extractables than do the PP/EVA compositions, and they provide films with better clarity than the PP/EVA compositions. In addition, residual vinyl acetate in PP/EVA blends can cause a pH shift in the contents (e.g., blood, plasma, etc.) of bags made from such blends.

The present invention is illustrated by the following examples, which are not intended to be limiting on its scope in any way.

EXAMPLE 1

The blends shown in Table I below were made, each in turn, in a ZSK-40 40 mm Werner Pfleiderer twin screw compounder. Operating conditions for the compounder were as follows:

| | |
|---|---|
| Screw speed (RPM) | 350 |
| Torque (%) | 60–75 |
| Throughput (psi) | 200 |
| Die pressure (psi) | 260–280 |
| Vacuum (inches) | 27 |
| Melt temperature (°C.) | 223 |
| Barrel temperatures (°C.) | |
| Zone 1 | 190 |
| Zone 2 | 200 |
| Zone 3 | 200 |
| Zone 4 | 200 |
| Zone 5 | 200 |
| Zone 6 | 210 |
| Zone 7 | 210 |

TABLE I

| BLEND COMPOSITIONS | | | | | | | | | | | | |
|---|---|---|---|---|---|---|---|---|---|---|---|---|
| | BLEND NO. | | | | | | | | | | | |
| BLEND COMPONENT[1] | 1 | 2 | 3 | 4 | 5 | 5 | 7 | A | B | C | D | E |
| Propylene-ethylene copolymer | 20 | 40 | 20 | 40 | 20 | 40 | 60 | 60 | 60 | | | |
| Polypropylene | | | | | | | | | | 20 | 40 | 60 |
| EMAC (20% MA, M.I. =2) | | | 80 | 60 | 80 | 60 | 40 | | 40 | | | |
| EMAC (20% MA, M.I. = 0.5) | 80 | 60 | | | | | | 40 | | 80 | 60 | 40 |

TABLE I-continued

BLEND COMPOSITIONS

| BLEND COMPONENT[1] | BLEND NO. | | | | | | | | | | | |
|---|---|---|---|---|---|---|---|---|---|---|---|---|
| | 1 | 2 | 3 | 4 | 5 | 5 | 7 | A | B | C | D | E |
| EMAC (27% MA, M.I. = 2) Methyl acrylate content wt. %[2] | 16 | 12 | 16 | 12 | 22 | 16 | 11 | 8 | 8 | 16 | 12 | 8 |

[1]Numbers indicate weight percent.
[2]Weight percent of methyl acrylate based on total blend weight.

EXAMPLE 3

Blown films were made by conventional techniques using each in turn the blends described in Table I above. The films were 4 mils thick. The RF sealing properties of these films were tested with the results shown in Table II below.

TABLE II

RF SEAL PROPERTIES

| RF SEAL CONDITIONS[a] | FILM FROM BLEND NO. | | | | | | | | | | | |
|---|---|---|---|---|---|---|---|---|---|---|---|---|
| | 1 | 2 | 3 | 4 | 5 | 6 | 7 | A | B | C | D | E |
| RF Seal, Preheat time, sec. | 0.7 | WNS[b] | 0.7 | WNS | 0.5 | 0.7 | 0.7 | WNS | WNS | 0.5 | WNS | WNS |
| RF Seal, Weld time, sec. | 1.2 | WNS | 1.5 | WNS | 0.5 | 1.5 | 1.7 | WNS | WNS | 1.7 | WNS | WNS |
| RF Seal, Dwell time, sec. | 1.0 | WNS | 1.0 | WNS | 2.0 | 1.0 | 1.0 | WNS | WNS | 2.0 | WNS | WNS |
| RF Seal, Cycle time, sec. | 2.2 | WNS | 2.5 | WNS | 2.5 | 2.5 | 2.7 | WNS | WNS | 3.7 | WNS | WNS |

[a]27.2 MHz, 12.5 KW sealing unit at 20% power, 3 inch annular die (2.22 inch[2] of sealing area), 0.026 inch NEMA XXXP buffer, 100 psi air pressure, ambient (unheated die).
[b]WNS indicates that film would not seal.

The film properties of these films were also tested, with the results indicated in Table III below.

TABLE III

| | 1 | 2 | 3 | 4 | 5 | 6 | 7 | A | B | C | D | E |
|---|---|---|---|---|---|---|---|---|---|---|---|---|
| Haze, % | 12 | 17 | 22 | 16 | 27 | 24 | 19 | 16 | 13 | 18 | 27 | 32 |
| Gloss | 61 | 47 | 61 | 51 | 42 | 49 | 49 | 43 | 51 | 41 | 36 | 31 |
| Clarity, % | 1 | 0 | 1 | 0 | 0 | 0 | 0 | 0 | 0 | 0 | 0 | 0 |
| MD[1] Tensile Strength, psi | 4000 | 4800 | 3300 | 4500 | 2500 | 3700 | 3400 | 4900 | 5000 | 3800 | 5000 | 4900 |
| TD[1] Tensile Strength, psi | 3900 | 4300 | 3000 | 4500 | 2000 | 3400 | 3300 | 4100 | 4400 | 3700 | 4000 | 4000 |
| MD Tensile Yield, psi | — | 1800 | — | 2300 | — | 1500 | 1400 | 2400 | 2600 | — | 2200 | 2300 |
| TD Tensile Yield, psi | — | 1600 | — | 2200 | — | 1300 | 1300 | 2300 | 1700 | — | 1900 | 2000 |
| MD Elongation, % | 655 | 695 | 625 | 690 | 740 | 730 | 705 | 730 | 730 | 625 | 720 | 680 |
| TD Elongation, % | 705 | 700 | 630 | 720 | 700 | 810 | 720 | 695 | 735 | 645 | 690 | 680 |
| MD Elmendorf Tear, gm/mil | 200 | 150 | 300 | 80 | 280 | 160 | 170 | 60 | 80 | 210 | 80 | 80 |
| TD Elmendorf Tear, gm/mil | 230 | 330 | 190 | 60 | 160 | 210 | 190 | 70 | 50 | 190 | 110 | 120 |
| MD 1% Secant Modulus, mpsi | 20 | 46 | 23 | 64 | 19 | 41 | 41 | 66 | 77 | 26 | 64 | 64 |
| TD 1% Secant Modulus, mpsi | 17 | 40 | 16 | 60 | 8 | 31 | 29 | 63 | 68 | 21 | 55 | 55 |
| Coefficient of Friction | >2.00 | 1.47 | 1.94 | 0.87 | >2.00 | 1.50 | 1.45 | 0.94 | 0.42 | 1.70 | 0.96 | 0.90 |

[1]The cast film is oriented in one direction as it is made. MD refers to the direction of orientation; TD refers to the direction traverse to the direction of orientation.

What is claimed is:

1. A composition comprising:
   A. a propylene-ethylene copolymer comprising about 1 to about 7 weight percent ethylene; and
   B. an ethylene-alkyl acrylate copolymer comprising at least about 20 weight percent alkyl acrylate, wherein the percent by weight of alkyl acrylate, based on the weight of A and B, is from about 10 to about 25.

2. The composition of claim 1 wherein the propylene-ethylene copolymer comprises about 1 to about 5 weight percent ethylene.

3. The composition of claim 1 wherein the propylene-ethylene copolymer comprises about 2 to about 2.5 weight percent ethylene.

4. The composition of claim 1 wherein the propylene-ethylene copolymer comprises about 2.2 weight percent ethylene.

5. The composition of claim wherein the ethylene-alkyl acrylate copolymer comprises about 20 to about 25 weight percent alkyl acrylate, and the percent by weight of alkyl acrylate based on the weight of A and B is at least about 15.

6. The composition of claim 1 wherein the ethylene-alkyl acrylate copolymer comprises about 25 weight percent alkyl acrylate, and the percent by weight of alkyl acrylate based on the weight of A and B is at least about 10.

7. The composition of claim 1 wherein the ethylene-alkyl acrylate copolymer is an ethylene-methyl acrylate copolymer.

8. The composition of claim 3 wherein the ethylene-alkyl acrylate copolymer is an ethylene-methyl acrylate copolymer.

9. The composition of claim 5 wherein the ethylene-alkyl acrylate copolymer is an ethylene-methyl acrylate copolymer.

10. The composition of claim 6 wherein the ethylene-alkyl acrylate copolymer is an ethylene-methyl acrylate copolymer.

11. The composition of claim 1 wherein the ethylene-alkyl acrylate copolymer has an average melt-point temperature equal to or greater than the value obtained from the expression:

$$\text{temperature (deg F)} = 238 - 2.16X$$

wherein X is the alkyl acrylate content of the ethylene-alkyl acrylate copolymer.

12. The composition of claim 8 wherein the ethylene-alkyl acrylate copolymer is an ethylene-methyl acrylate copolymer having an average melt-point temperature equal to or greater than the value obtained from the expression:

$$\text{temperature (deg F)} = 248 - 2.9Y$$

wherein Y is the methyl acrylate content of the ethylene-methyl acrylate copolymer.

13. A film made from a composition comprising:
A. a propylene-ethylene copolymer comprising about 1 to about 7 weight percent ethylene; and
B. an ethylene-alkyl acrylate copolymer comprising at least about 20 weight percent alkyl acrylate.
wherein the percent by weight of alkyl acrylate, based on the weight of A and B, is from about 10 to about 25.

14. The film of claim 13 wherein the propylene-ethylene copolymer comprises about 1 to about 5 weight percent ethylene.

15. The film of claim 13 wherein the propylene-ethylene copolymer comprises about 2 to about 2.5 weight percent ethylene.

16. The film of claim 13 wherein the propylene-ethylene copolymer comprises about 2.2 weight percent ethylene.

17. The film of claim 13 wherein the ethylene-alkyl acrylate copolymer comprises about 20 to about 25 weight percent alkyl acrylate, and the percent by weight of alkyl acrylate based on the weight of A and B is at least about 15.

18. The film of claim 13 wherein the ethylene-alkyl acrylate copolymer comprises about 25 weight percent alkyl acrylate, and the percent by weight of alkyl acrylate based on the weight of A and B is at least about 10.

19. The film of claim 13 wherein the ethylene-alkyl acrylate copolymer is an ethylene-methyl acrylate copolymer.

20. The film of claim 15 wherein the ethylene-alkyl acrylate copolymer is an ethylene-methyl acrylate copolymer.

21. The film of claim 17 wherein the ethylene-alkyl acrylate copolymer is an ethylene-methyl acrylate copolymer.

22. The film of claim 18 wherein the ethylene-alkyl acrylate copolymer is an ethylene-methyl acrylate copolymer.

23. The film of claim 13 wherein the ethylene-alkyl acrylate copolymer has an average melt-point temperature equal to or greater than the value obtained from the expression:

$$\text{temperature (deg F)} = 238 - 2.16X$$

wherein X is the alkyl acrylate content of the ethylene-alkyl acrylate copolymer.

24. The film of claim 23 wherein the ethylene-alkyl acrylate copolymer is an ethylene-methyl acrylate copolymer having an average melt-point temperature equal to or greater than the value obtained from the expression:

$$\text{temperature (deg f)} = 248 - 2.9Y$$

wherein Y is the methyl acrylate content of the ethylene-methyl acrylate copolymer.

* * * * *